(12) United States Patent
Sudhues et al.

(10) Patent No.: US 12,364,195 B2
(45) Date of Patent: Jul. 22, 2025

(54) CUTTING MECHANISM WITH CUTTING ELEMENTS WHICH ARE MOUNTED IN A HEIGHT-ELASTIC MANNER

(71) Applicant: Carl Geringhoff GmbH & Co. KG, Ahlen (DE)

(72) Inventors: Steffen Sudhues, Ahlen (DE); Dirk Webermann, Senden (DE); Raphael Stückmann, Drensteinfurt (DE); Jochen Scharmann, Warendorf (DE); Michael Pokriefke, Hude (DE)

(73) Assignee: Carl Geringhoff GmbH & Co. KG, Ahlen (DE)

( * ) Notice: Subject to any disclaimer, the term of this patent is extended or adjusted under 35 U.S.C. 154(b) by 721 days.

(21) Appl. No.: 17/761,617

(22) PCT Filed: Sep. 11, 2020

(86) PCT No.: PCT/EP2020/075481
§ 371 (c)(1),
(2) Date: Mar. 18, 2022

(87) PCT Pub. No.: WO2021/052885
PCT Pub. Date: Mar. 25, 2021

(65) Prior Publication Data
US 2022/0386528 A1 Dec. 8, 2022

(30) Foreign Application Priority Data
Sep. 19, 2019 (DE) .................. 10 2019 125 282.2

(51) Int. Cl.
*A01D 41/14* (2006.01)

(52) U.S. Cl.
CPC ......... *A01D 41/141* (2013.01); *A01D 41/142* (2013.01)

(58) Field of Classification Search
CPC ..... A01D 41/14; A01D 41/141; A01D 41/142
See application file for complete search history.

(56) References Cited

U.S. PATENT DOCUMENTS

| 4,927,440 A * | 5/1990 | Butler .................. A01D 45/008 460/130 |
| 5,464,371 A | 11/1995 | Honey |
| 7,971,420 B1 | 7/2011 | Bollin |

(Continued)

FOREIGN PATENT DOCUMENTS

| GB | 873947 | 8/1961 |
| WO | 02/102138 | 12/2002 |

*Primary Examiner* — Tyler J Lee
(74) *Attorney, Agent, or Firm* — Gudrun E. Huckett

(57) ABSTRACT

The aim of the invention is to mount the cutting elements in a height-elastic manner in order to allow the cutter bar to be guided as close to the base as possible and in the process reduce the risk of damage in the event of contacting the base. This is achieved in that the adjustment drive (22) is rotatably connected to a first side (28) of a rocker lever (24) which can be rotated about an axis (26) and the second side (30) of which rotatably engages with an energy store (32) that is adjustable in length, and the frame part (6) can be moved against the force of the energy store (32) that is adjustable in length by the swinging arms (12) via a rocking movement of the rocker lever (24) about the axis (26) miming transversely to the working direction of the cutting mechanism (4) when a lifting force acts on at least one swinging arm (12).

22 Claims, 7 Drawing Sheets

(56) References Cited

U.S. PATENT DOCUMENTS

| | | |
|---|---|---|
| 10,216,156 B2 | 2/2019 | Enns et al. |
| 2011/0197561 A1 | 8/2011 | Priepke |
| 2014/0318098 A1 | 10/2014 | Fay, II |
| 2015/0007545 A1 | 1/2015 | Honas et al. |
| 2018/0020617 A1 | 1/2018 | Weitenberg et al. |
| 2019/0029176 A1* | 1/2019 | Yanke .................... A01D 41/14 |
| 2019/0200523 A1 | 7/2019 | Fay, II et al. |
| 2020/0323141 A1* | 10/2020 | Perez Ramirez .... A01D 41/142 |

* cited by examiner

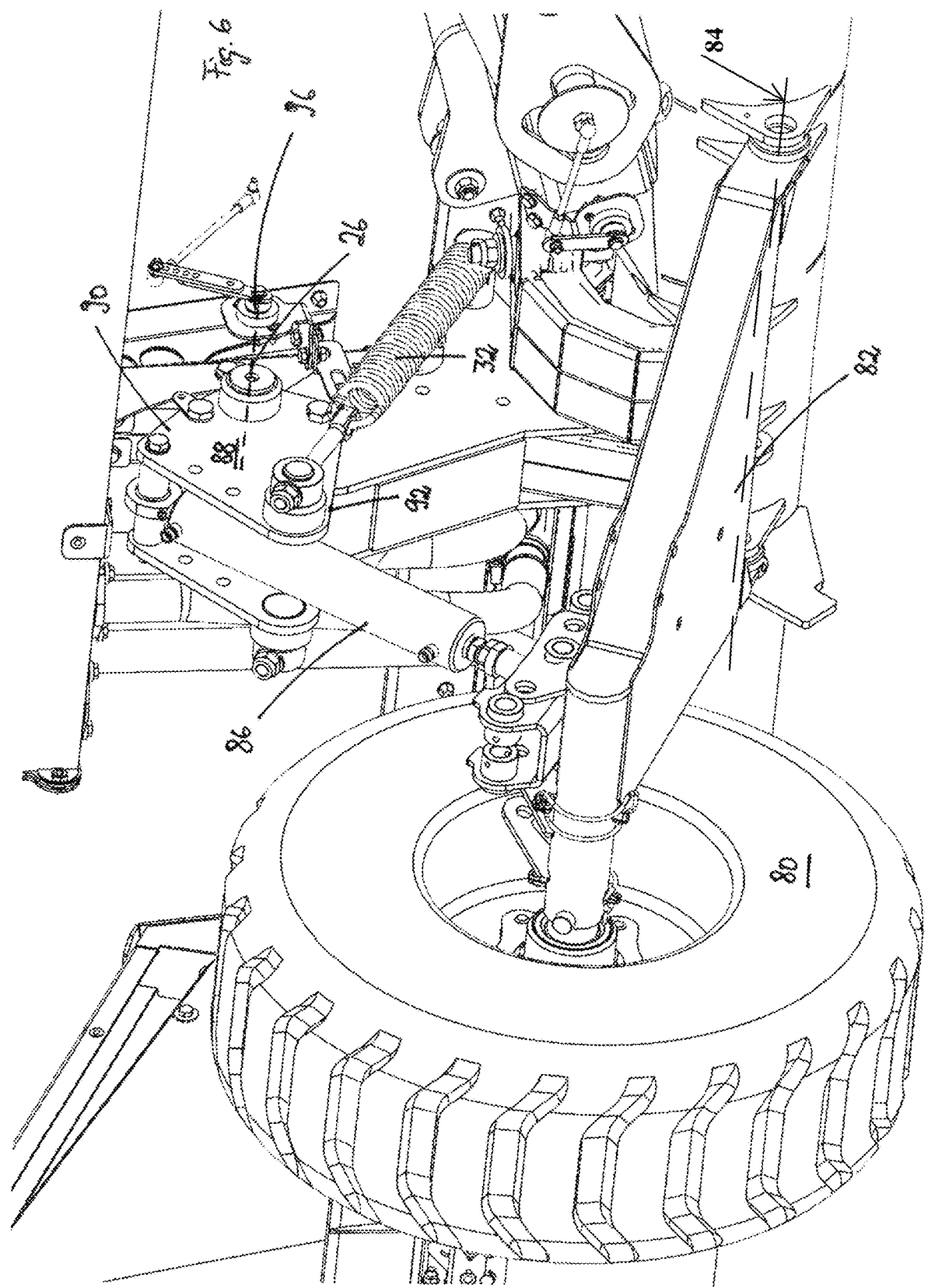

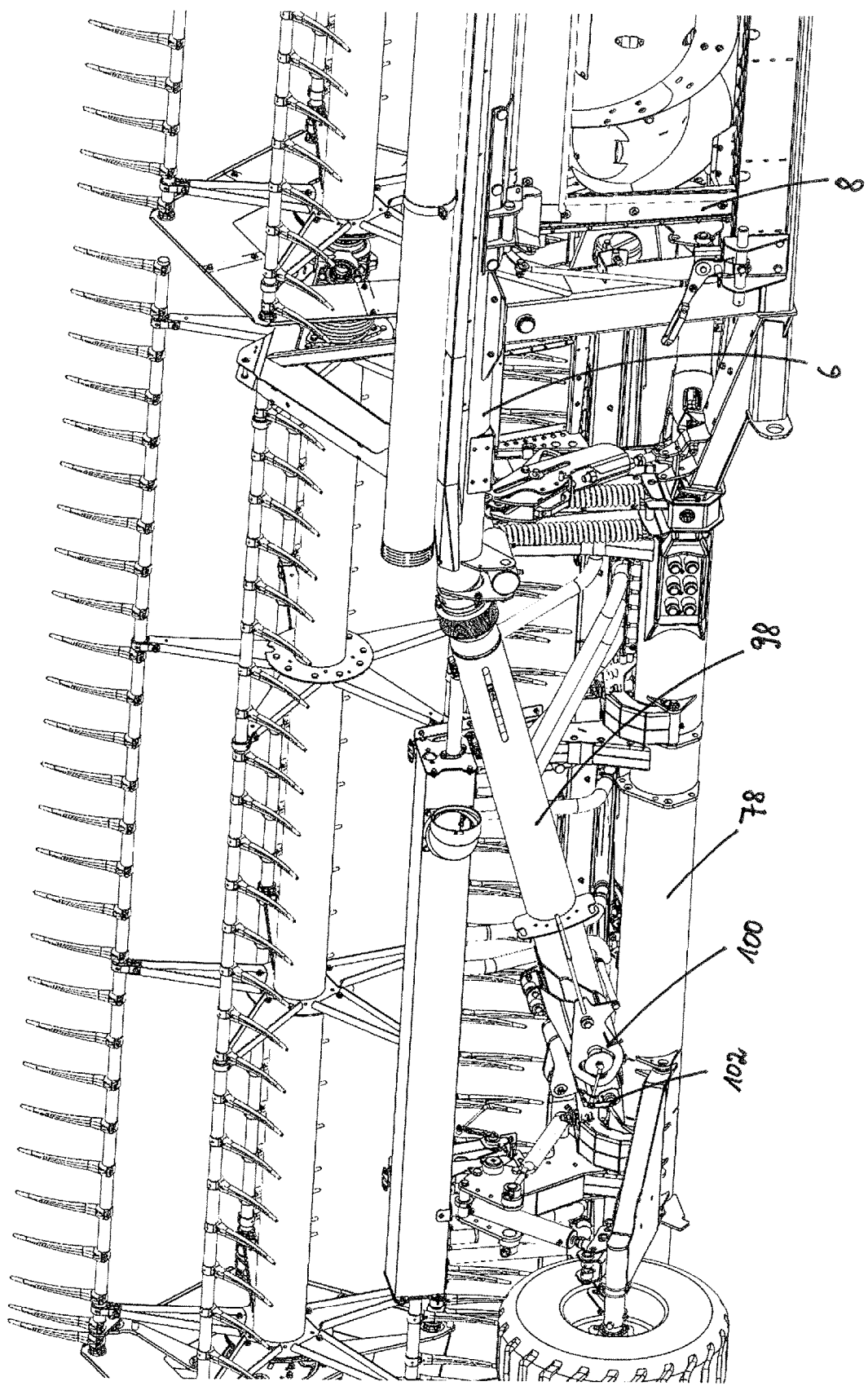

CUTTING MECHANISM WITH CUTTING ELEMENTS WHICH ARE MOUNTED IN A HEIGHT-ELASTIC MANNER

BACKGROUND OF THE INVENTION

The present invention concerns a cutting mechanism for attachment to a harvesting machine with a frame part that is connected to an attachment frame that comprises connection means for attachment to an intake channel of a harvesting machine, wherein the frame part comprises swinging arms pointing in working direction having cutting elements for cutting the crop attached to their leading ends, a support action of the frame part rotatable about an axis in a rotary bearing in the attachment frame, and a motor-driven adjustment drive for adjustment of the cutting angle of the cutting elements connected to the frame part, wherein upon actuation thereof the angle of attack of the cutting elements to the ground changes.

As harvesting machines, for example, combine harvesters are conceivable. The cutting mechanisms can be single-part or multi-part grain cutting mechanisms that can be articulated to each other and convey the crop by means of screw conveyors or conveyor belts.

Often, grain cutting mechanisms provided for the harvesting work are provided with rigid frames having fixedly installed at their leading ends, as an example of cutting elements, a cutter bar with a plurality of adjacently arranged knife blades which, with oscillating knife movements, cut the crop present at the cutter bar from the stubble remaining on the field so that it can drop on the cutting mechanism and from there can be conveyed for further processing through the intake channel to the harvesting machine or for windrowing. With such rigid frames and rigidly installed cutter bars with the knife blades connected thereto, it is however difficult, in particular in case of uneven ground conditions, to cut and pick up the crop close to the ground when the crop is lying close to the ground or is to be cut close to the ground. This holds true in particular also for multi-part harvesting attachments with larger working widths of more than 6 m.

A cutting angle adjustment for the cutting elements is advantageous in order to be able to better adjust the cut and the transfer of the cut crop to the conveying members of the cutting mechanism to the respective crop and to the harvesting conditions present at the harvest.

Even though ground copying controls are known with which the cutting mechanisms can be guided close to the ground, they react frequently too slowly in order to continuously precisely adjust to the ground conditions even in difficult conditions, such as uneven ground conditions and laid grain or crop that is growing close to the ground such as, for example, soybean, and in this way harvest and convey with as little loss as possible the entire crop. Also, the ground copying controls are frequently only designed to adjust a cutting mechanism as a whole in its height position and/or pivot position. A height adjustment of a segment of a cutting mechanism is usually not possible via the harvesting machine.

In case of grain cutting mechanisms, there is the general problem that they are held at long intake channels whose pivot angle positions are adjusted by hydraulic cylinders that, across their length, must perform comparatively long adjusting travels in order to adjust the intake channel by only a few angle degrees upwardly or downwardly. In order to prevent damages due to contacting ground or rocks, the cutting mechanisms are frequently adjusted and guided too high during the harvest work by the drivers of the harvesting machines with acceptance of crop losses.

From the publication U.S. Pat. No. 5,464,371 A, it is known to employ a leaf spring pack for supporting the cutter bar that is held at a swinging arm so that the cutting mechanism can adjust more flexibly to the ground conditions. The leaf spring pack however permits only a limited pivoting action of the rigid swinging arm. By mounting the leaf spring pack below the swinging arm, the ground clearance of the cutting mechanism is reduced.

From the publication WO 2002/102138 A1, it is known to use of a parallelogram linkage in order to provide a cutting mechanism with the possibility for a better adjustment to the ground. The parallelogram linkage is however cost-intensive and requires many movable component groups that are partially exposed close to the ground to an increased wear because of intensive soiling.

It is the object of the present invention to support the cutting elements in a height-elastic manner in order to be able to guide the cutter bar as close as possible to the ground and, in this context, reduce the risk of damage in case of a ground contact.

SUMMARY OF THE INVENTION

The object is solved in that the adjustment drive is connected rotatably to a first side of a rocker lever that is rotatable about an axis, a length-adjustable energy store engaging rotatably its second side, and the frame part with the swinging arms is movable against the force of the length-adjustable energy store by a tilting movement of the rocker lever about an axis extending transversely to the working direction of the cutting mechanism when a lifting force is acting at least on one swinging arm.

According to the invention, the device for adjustment of the cutting angle of a cutting mechanism is thus utilized to enable an upward evasive movement of the cutting elements arranged at the front side of the cutting mechanism, for example, a cutter bar, when the latter has a ground contact. The device for cutting angle adjustment thus not only serves for adjustment of the cutting angle but, due to it being made flexible, it is also becoming a component of ground copying of the cutting mechanism, in particular also for the fine adjustment of the cutting elements to changes in the ground contour.

In this context, various cutting elements can be arranged at a cutting mechanism such as a cutter bar with oscillatingly driven blades, rotatively driven cutting discs arranged adjacent to each other or staggered relative to each other in working direction of the cutting mechanism, circulatingly driven knife blades or the like. In the following, the invention, for reasons of simplification, will be explained with the aid of the embodiment of a cutter bar in more detail without the invention being limited thereto in regard to the cutting elements.

The evasive movement is enabled in that a length-changeable energy store is intermediately positioned between the device for adjustment of the cutting angle and the frame part and enables an evasive movement by a length change. The length change is transmitted from the frame part via a rocker lever at which at a first end the length-changeable energy store and at its second end the device for adjustment of the cutting angle engage. The movement reserve for an evasive movement is thus not solved by a movability of the device for adjustment of the cutting angle itself but by the length-changeable energy store that is connected by the rocker lever to the device for adjustment of the cutting angle.

The solution according to the invention provides several technical advantages. The device for adjustment of a cutting angle can be adjusted at a point in time to a desired cutting angle. The preselected cutting angle is then retained in principle when the harvesting machine travels across a field. Since the height compensation for the cutter bar upon a contact with the ground is realized by the length-changeable energy store, the cutting angle must not be continuously adjusted by the device for adjustment of the cutting angle. A basic adjustment is maintained at which continuous slight ground adaptations are absorbed by the length-changeable energy store. The function separation between the basic adjustment of the cutting angle of the frame part by means of the corresponding device and the absorption of evasive movements and their restoring action by means of the length-changeable energy store makes it possible to optimize the respective components in regard to their respective purpose. Thus, the device for adjustment of the cutting angle can be designed for the movement of great forces but with comparatively slow movements and a comparatively sluggish movement behavior, while the length-changeable energy store can be designed to react quickly to comparatively minimal forces. When the ground pressure on the cutter bar due to ground contact increases, it can evade very quickly, sensitively, and flexibly in upward direction against the length-changeable energy store. In doing so, a restoring force is built up in the length-changeable energy store. When the ground pressure drops again, the cutter bar is then very quickly and easily returned again in downward direction into the normal position by the restoring force built up during the evasive movement in the length-changeable energy store.

Important for the more flexible adaptation to ground unevenness is the aspect that the length of the lever arm that must be moved in order to perform a height adaptation of the cutter bar is much shorter for the distance of the cutter bar from the pivot point of the frame part in the rotary bearing than the distance of the cutter bar from the axis of rotation of the intake channel. For the shorter lever arm, much smaller adjusting travels are therefore sufficient in order to realize the same changes in the height position of the cutter bar. The shorter adjustment travels enable much faster adaptations of the height position of the cutter bar. In this context, also less weight with a reduced mass inertia is moved. Thus, a rocker lever is sufficient in order to transmit the short adjusting travels to the length-changeable energy store.

The function separation between the device for adjustment of a cutting angle and the length-changeable energy store enables in addition a special cutting mechanism guidance upon forward travel of the harvesting machine in a field. Since the cutting mechanism is connected to an intake channel of the harvesting machine and by means of the height adjustment of the intake channel—optionally also by additional adjust cylinders at the intake channel—is held at a working height, the cutting mechanism with the intake channel—and the optionally additionally provided adjust cylinders thereat—can be lowered to the ground, by maintaining a preselected cutting angle, until the cutter bar contacts the ground. In this context, the intake channel can even be lowered so far in downward direction until the length-changeable energy store responds and builds up a restoring force due to a beginning tilting movement of the frame part. In this lowered position, the cutter bar is then held pushed against the ground by the produced restoring force of the length-adjustable energy store. However, it is not the weight of the entire cutting mechanism that is pushing but only the length-changeable energy store with the restoring force built up therein. This comparatively minimal restoring force is already sufficient for a particularly pronounced ground copying of the surface shape of the worked-on field by the cutter bar when the harvesting machine with the cutting mechanism kept close to the ground in this manner moves into the field to be worked. The cutter bar can nevertheless be driven by the driver in this close contact at the ground without having to fear damages to the cutter bar because the length-changeable energy store still provides evasive reserves when it has not yet been moved to its stop in the adjusted basic position and provides an adjusting travel potential sufficient for this purpose.

Smaller height changes in the ground contour can be compensated elastically in this manner by the length-changeable energy store without the rather slow and heavy height adjustment of the cutting mechanism—and optionally of the additional adjust cylinders arranged thereat—by an adjustment of the intake channel having to be actuated for this purpose. These control members are required only when larger unevenness occurs in the ground surface and the adjusting travel of the length-changeable energy store is no longer sufficient for their compensation.

The sensitive height guiding action of the cutter bar against the length-changeable energy store reduces the wear in the cutter bar, of the skids positioned underneath, and in the frame part because fewer force peaks are acting thereon. Also, the wear in the other adjustment devices for the height guiding action of the cutting mechanism through the intake channel is reduced because they must react much less to changes in the height position of the cutting mechanism in the ongoing harvesting operation.

The function separation between the device for adjustment of a cutting angle and the length-changeable energy store makes it additionally possible to adjust the cutter bar particularly sensitively to a desired value for the contact pressure at which the cutter bar is held pushed against the ground. For this purpose, the frame part is adjusted first with the device for adjustment of a cutting angle to a cutting angle at which reserves are still present in order to be able to pivot the frame part with the cutter bar still farther in downward direction toward the ground later on. Subsequently, the cutting mechanism with the intake channel—and/or the adjust cylinders optionally additionally present at the intake channel—is lowered so far to the ground that the cutter bar rests on the ground and the length-changeable energy store responds. When the device for adjustment of a cutting angle is now actuated in this pivot position in a direction in which the frame part with the cutter bar would be moved still farther in downward direction if it were not resting on the ground, this adjusting movement is transmitted by the rocker lever to the length-changeable energy store in which, due to the retraction movement, the restoring forces are reduced. In this manner, the pretension of the length-changeable energy store is adjusted to a lower value. The contact pressure with which the cutter bar is held on the ground can thus be fine-adjusted by the actuation of the device for adjustment of a cutting angle to a desired value. In this context, for a corresponding configuration of the length-changeable energy store, there also still remain spring travel reserves that during the harvesting work still permit evasive movements of the cutter bar—for a then increased contact pressure—so that the risk of damage of the cutter bar continues to remain low.

An advantage of the invention can be seen in that the frame part, whose cutting angle is configured to be movable against the length-changeable energy store, can carry only the cutting elements of the cutting mechanism that extend across a portion of the working width of the cutting mechanism. The evasive movement according to the invention of a cutter bar against a length-changeable energy store, connected by a rocker lever, can be realized thus also only across partial working widths of the cutting mechanism and independent of height adaptations on the part of the harvesting machine for the cutting mechanism as a whole, or several frame parts are used in distribution across the working width of the cutting mechanism and each enable a ground adaptation according to the invention with a rocker lever-supported support action on a length-changeable energy store. A ground adaptation is then realized respectively only in the section of the working width of the cutting mechanism in which a height adaptation is required. In this context, reduced weights are then moved in comparison to a height adaptation across the entire working width of the cutting mechanism sp that the ground adaptation is still more flexibly and more easily possible.

It can be provided that the axis about which the rocker lever is pivotable is oriented transversely to the working direction of the cutting mechanism. Likewise, also the axes with which the motor-driven drive of the device for adjustment of the cutting angle and/or the length-changeable energy store are connected to the rocker lever can be oriented transversely to the working direction of the cutting mechanism. Due to the transverse orientation of these axes, a movability of the machine elements in question results without any disturbing transverse forces being created upon movements.

The swinging arms are longitudinal supports that, for example, across their full or partial length can be embodied as cast profiles or sheet metal profiles and/or as strips of a flat material.

The rocker lever is preferably stationarily but rotatably connected about a pivot axis to the frame part. Due to its stationary position in the frame part, the rocker lever performs tilting movements when, due to a change of the pivot position of the frame part caused by ground pressure, the spatial position of the connection point of the rocker lever at the frame part changes in relation to the stationarily remaining connection point of the motor-driven adjustment drive of the device for adjustment of the cutting angle at the rocker lever. Due to the tilting movement of the rocker lever, the spatial position of the connection point of the length-changeable energy store at the rocker lever changes also inevitably, through which the length-changeable energy store is extended against the buildup of a restoring force or is retracted again due to the release of a restoring force. The rocker lever comprises thus three connection points wherein according to an embodiment the connection point of the rocker lever at the frame part is arranged at the central region of the rocker lever and the connection points of the adjustment device and of the length-changeable energy store are arranged at opposite ends of the rocker lever.

According to an embodiment of the invention, the length-changeable energy store is formed of one or a plurality of springs. Mechanical springs are inexpensive, low maintenance, always ready to operate, and can be designed in regard to their spring characteristic line precisely to the application situation. It is also possible to employ hydraulic or pneumatic springs which in their spring behavior come close to the behavior of a mechanical spring.

According to an embodiment of the invention, at the cutting mechanism a sensor is arranged that detects the actual length of the length-changeable energy store or the pivot position of the rocker lever, the sensor is connected to an evaluation electronics to which it transmits a sensor signal corresponding to the length or the pivot position, and the evaluation electronics comprises a program that generates with a corresponding programming a warning signal when the sensor signal is in a range of an upper or lower limit value. By means of the sensor, monitoring is possible whether the movements of the length-changeable energy store approach a limit value. The warning signal can be issued acoustically, optically and/or in the context of a display device. When the sensor frequently signals, the driver of the harvesting machine can adjust the height position of the cutting mechanism and/or the cutting angle of the frame part such that the movements of the length-changeable energy store are less often within the limit range.

According to an embodiment of the invention, at the cutting mechanism a sensor is arranged that detects the actual length of the length-changeable energy store or the pivot position of the rocker lever, the sensor is connected to an evaluation electronics to which it transmits a sensor signal corresponding to the length or the pivot position, the evaluation electronics comprises a program that compares with a corresponding programming the sensor signal with a nominal value, is connected to the motor-driven adjustment drive, and issues an adjusting command to the adjustment drive when the sensor signal deviates by a predetermined measure from the nominal value, wherein the adjusting command moves the adjustment drive in a direction with which by a tilting movement of the rocker lever the pretension of the length-changeable energy store is increased or lowered, and/or the evaluation electronics comprises a program that compares with a corresponding programming the sensor signal with a nominal value, is connected with the motor-driven adjustment drive, and issues an adjusting command to the adjustment drive when the sensor signal deviates by a predetermined measure from the nominal value, wherein the adjusting command moves the adjustment drive in a direction by which the difference between the sensor signal and the nominal value is reduced. With this embodiment, an automated adaptation of the cutting angle to the actual requirements of the harvesting operation and of the ground contour is possible. The program can be adapted with a corresponding programming to certain ground types and conditions as well as travel speeds. The contact forces can be controlled with the sensor signal.

According to an embodiment of the invention, the length-changeable energy store comprises one or a plurality of force-dependently controlled drives, a force sensor detects the force acting on the frame part and/or the length-changeable energy store, and the force sensor transmits a corresponding force sensor signal to the evaluation electronics connected to the force sensor, wherein the evaluation electronics comprises a program that compares with a corresponding programming the force sensor signal with a nominal value, is connected to the motor-driven adjustment drive, and issues an adjusting command to the adjustment drive when the force sensor signal deviates by a predetermined measure from the nominal value, wherein the adjusting command moves the adjustment drive in a direction with which by a tilting movement of the rocker lever the pretension of the length-changeable energy store is increased or lowered, and/or the evaluation electronics comprises a program that compares with a corresponding programming the force sensor signal with a nominal value, is connected to the motor-driven adjustment drive, and issues an adjusting command to the adjustment drive when the force sensor signal deviates by a predetermined measure from the nominal value, wherein the adjusting command moves the adjustment drive in a direction by which the difference between the force sensor signal and the nominal value is reduced. The embodiment of the invention is aimed at a length-changeable energy store that realizes the length change by a motor-driven machine element, for example, a hydraulic cylinder supported by a pressure-controlled hydraulic system or a pressure-controlled pneumatic cylinder or an electric motor. In this context, the energy store function can be realized also motor-driven in that the respective drive is loaded by a counter force that corresponds, for example, to a force that would have been built up by a corresponding adjustment travel in a mechanical spring. By means of the evaluation electronics, an automated adaptation of the cutting angle to the actual requirements of the harvesting operation and of the ground contour is possible here also. The program can be adapted with a corresponding programming to certain ground types and conditions as well as travel speeds that takes into consideration their usual contact forces.

According to an embodiment of the invention, the cutting mechanism comprises an adjustable driven conveying aid whose actual position is monitored by a position sensor that is connected to the evaluation electronics and that transmits the position sensor value to the evaluation electronics, and the evaluation electronics comprises a program that determines with a corresponding programming an adjusting command to the adjustment drive for adjusting the cutting angle and/or the height control of the intake channel as a function of the position sensor value regarding the actual position of the conveying aid. As conveying aid, for example, a reel is conceivable whose influence from its weight force on the cutting mechanism contact force as a function of its position is compensated according to this embodiment.

According to an embodiment of the invention, the evaluation electronics is connected to a speed sensor and the evaluation electronics comprises a program that determines with a corresponding programming the adjusting command as a function of the speed sensor signal transmitted by the speed sensor. Depending on the forward travel speed of the harvesting machine, the parameters taken into consideration by the evaluation electronics in automatic control systems for determining the value for an adjusting command can be of different magnitude. Depending on the driven speed, the adjustment of the cutting angle can be carried out faster or slower.

According to an embodiment of the invention, the evaluation electronics comprises a program that determines with a corresponding programming the exceedance of a limit value across a time interval when evaluating the sensor signal or the force sensor signal and generates an adjusting signal to a height control of the intake channel of the harvesting machine in response to which the height control lowers or lifts the intake channel. In this embodiment of the invention, the evaluation electronics performs automatic adaptations in the control of the height position of the intake channel of the harvesting machine. Such an adaptation appears to be particularly expedient when, based on the sensor data, it is apparent that the height position of the cutting mechanism predetermined by the pivot position of the intake channel is too high or too low. The height position of the intake channel can then be corrected accordingly.

According to an embodiment of the invention, on opposite sides of the intake channel adjustment drives are provided that are each rotatably connected to a first side of a respective rocker lever that is rotatable about an axis, a respective length-changeable energy store engages rotatably at its second side, and the frame part is movable with the swinging arms against the force of the energy store or energy stores by a tilting movement of the respective rocker lever about the axis when a lifting force is acting at least on one swinging arm, wherein the frame part is also supported on opposite sides of the intake channel by a respective length-changeable energy store. The dual support of the frame part on opposite sides of the intake channel provides the possibility that only one side of the frame part lifts when the cutter bar on this side of the frame part contacts the ground but not the other side. In case of an uneven ground contour that does not extend parallel to the rest position of the cutter bar, the cutter bar, viewed across the working width of the frame part, can adapt better to the ground contour in the respective partial working widths. Nonetheless, the frame part as a whole can pivot to the rear when the cutter bar is pushed upwardly on both sides by a ground contact.

According to an embodiment of the invention, the evaluation electronics comprises a program with which with a corresponding programming the adjustment drives arranged on both sides of an intake channel are movable independent from each other with adjusting commands as they have been described before already as a respective embodiment of the invention. The cutting angles at which the corresponding sides of the frame part are adjusted can thus deviate from each other. Thus, for example, the cutting angle of a frame part can be adjusted steeper when the contact pressure of the cutter bar is reduced thereat and/or the distance of the cutter bar to the ground is enlarged, or the cutting angle is decreased when the ground pressure increases at the cutter bar. It is also possible to enlarge or to reduce the cutting angle only at one side of the frame part in order to keep the cutter bar thereat close to the ground without carrying the risk that damages due to a too large contact pressure or crop losses occur thereat due to a too large distance of the cutter bar from the ground. The cutting angle of the different partial working widths of the frame part can be continuously automatically adjusted to the respective ground conditions by the evaluation electronics upon forward travel of the harvesting machine.

According to an embodiment of the invention, the evaluation electronics comprises a program that, upon evaluation of the sensor signals or of the force sensor signals, determines with a corresponding programming an exceedance of a limit value across a time interval at one or both sides of the intake channel and, upon an exceedance of a limit value across a time interval on one side of the intake channel or upon a difference between the values of the sensor signals or of the force sensor signals on opposite sides of the intake channel that exceeds across a time interval a threshold value, generates an adjusting signal and transmits the latter to a pivot control, connected to the evaluation electronics, for pivoting the cutting mechanism about the longitudinal axis of the harvesting machine pointing in working direction, upon which the pivot control rotates the cutting mechanism by actuation of a pivot drive in a direction about the longitudinal axis. When monitoring of the sensor values across a time interval indicates that one side of the frame part exhibits too great a contact pressure and the other side of the frame part too small a contact pressure, this suggests to rotate the cutting mechanism about the longitudinal axis pointing in working direction in order to thereby hold the cutting mechanism as parallel as possible to the ground contour again. By such a correction of the pivot position of the cutting mechanism as a whole, adjustment travels of the rocker lever of approximately the same size in both directions are available again on both sides of the intake channel for approximately identical restoring forces of the length-changeable energy stores.

According to an embodiment of the invention, the rocker lever or rocker levers are arranged at the upper end or above the rear wall of the cutting mechanism and the length-adjustable energy store or energy stores are arranged at the rear side of the rear wall in a precisely vertical, or at least primarily vertical, orientation. In this arrangement, the height of the rear wall can be utilized as an installation space for the arrangement of the length-changeable energy store without the latter hindering the crop flow of the crop from the cutter bar toward the intake channel of the harvesting machine. Since the cutting angle of the frame part can be adjusted particularly well with the motor-driven adjustment drive when the motor-driven adjustment drive engages the rotary bearing at a greater distance to the pivot axis that is arranged close to the ground and the motor-driven adjustment drive is arranged for this reason at the upper end or above the rear wall of the cutting mechanism and connected to the frame part, a comparatively short lever travel, that requires only a minimal installation space and does not hinder the crop flow of the crop, results relative to the pivot axis of the rocker lever in the frame part for the connection point of the adjustment drive to the rocker lever that is also arranged at the upper end or above the rear wall of the cutting mechanism. The short lever travel to the adjustment drive can be transmitted well with a likewise short lever arm of the rocker lever, originating at the upper end or above the rear wall of the cutting mechanism, to the length-changeable energy store which is arranged behind the rear wall of the cutting mechanism. In this way, an arrangement of the components for adjustment of the pivot angle and of the spring support of the frame parts results that requires as a whole little installation space and does not impair the crop flow of the crop.

According to an embodiment of the invention, the swinging arms are rigidly embodied and form together with the frame part a rigid component unit. Of course, it is possible to design the swinging arms such that, by a separate axis of rotation relative to the rigid frame part and/or a certain own elasticity, they enable already a height compensation of the cutter bar that is connected to its leading end. For a rigid configuration of the swinging arms and of the frame part as a common rigid component unit, there results however the advantage that the conveying members of the cutting mechanism between the cutter bar and the discharge end to the intake channel of the harvesting machine have geometric relationships that stay the same relative to the cutter bar, relative to each other, and relative to the discharge end to the conveying channel so that a height adjustment of the cutter bar is realized only by the rocker lever against the length-changeable energy store. The adjustment travels and adjustment forces occurring in this context are measurable and adjustable in a changeable way so that it is possible with a manageable technical expenditure to affect the occurring adjustment movements in a targeted fashion such that an optimal ground adaptation of the cutter bar to a continuously changing surface contour of the ground results. In order to avoid increased force peaks in the respective components, it is however advantageous to permit a certain measure of own elasticity of the swinging arms due to their construction for which however only minimal and negligible changes of the height position of the cutter bar should result in relation to the adjustment travels enabled by the rocker lever, when the occurring adjustment movements are to be affected in a targeted fashion by means of the rocker lever.

According to an embodiment of the invention, the attachment frame and/or the frame part at opposite sides are connected in a pivotable manner to lateral frames having also cutting elements arranged at their longitudinal side facing in working direction, the lateral frames are supported by a wheel on the ground, respectively, and the respective wheel is fastened to a trailing arm connected to the lateral frame so as to be pivotable about an axis, wherein a respective trailing arm is adjustable by means of a motor-driven adjustment drive in its height position, the adjustment drive is rotatably connected with a first side of a rocker lever that is rotatable about an axis, at its second side a length-changeable energy store engages in a rotatable manner, and the trailing arm is movable against the force of the length-changeable energy store by a tilting movement of the rocker lever. In this embodiment of the invention, the cutting mechanism is of a multi-part configuration, wherein, at the central attachment frame and/or the frame part, additional lateral frames are laterally attached that define together with the central frame part the total working width of the cutting mechanism. In order to enable a ground adaptation of the cutting mechanism across the entire working width of the cutting mechanism, the lateral frames are pivotably connected to the attachment frame and/or the central frame part, wherein the pivot movements of the lateral frames are realized about a respective axis pointing in the working direction of the cutting mechanism. The weight of the lateral frames in this context is at least partially supported directly on the ground by a trailing arm and a wheel connected thereto so that this weight proportion must not be carried by the intake channel and the harvesting machine. Depending on the pivot position of the trailing arm, a different weight proportion of the lateral frame supported on the ground by the wheel or by the part of the cutter bar belonging to the lateral frame results. The pivot position of the trailing arm is adjustable by a motor-driven adjustment drive to a desired angle of attack. In order to enable in this context a particularly sensitive ground adaptation of the cutter bar even in the region of the lateral frames, the device disclosed above for adjustment of the cutting angle of the central frame part with a springy support of the cutter bar against a length-changeable energy store by a rocker lever is adopted as a device for springy support of the trailing arm by a rocker lever against a length-changeable energy store, wherein linking of the motor-driven adjustment drive to the adjustment kinematics is adopted also in this device. The afore described explanations regarding the embodiment of the springy support of the frame part apply likewise to the embodiment and the advantages of this embodiment of the springy support of the trailing arm.

According to an embodiment of the invention, the length-changeable energy store is formed of one or a plurality of springs. Here also, the afore described explanations in regard to the configuration of the springy support of the frame part apply likewise to the spring support of the trailing arms.

According to an embodiment of the invention, the trailing arm has correlated therewith a sensor that detects the actual pivot position of the trailing arm and/or the force which is acting on the trailing arm, the sensor is connected to an evaluation electronics to which it transmits a sensor signal corresponding to the actual pivot position or the acting force, and the evaluation electronics comprises a program that generates with a corresponding programming a warning signal when the sensor signal is in a range of an upper or lower limit value. Here also, the afore described explanations regarding the embodiment of the sensor monitoring of the springy support of the frame part with an evaluation electronics apply correspondingly to the springy support of the trailing arms.

According to an embodiment of the invention, a sensor is arranged at the trailing arm that detects the actual pivot position of the trailing arm and/or the force acting on the trailing arm, the sensor is connected to an evaluation unit to which it transmits the sensor signal which is corresponding to the actual pivot position or the acting force, the evaluation electronic comprises a program that compares with a corresponding programming the sensor signal with a nominal value, is connected to the motor-driven adjustment drive, and issues an adjusting command to the adjustment drive when the sensor signal deviates by a predetermined measure from the nominal value, wherein the adjusting command moves the adjustment drive in a direction with which by a tilting movement of the rocker lever the pretension of the length-changeable energy store is increased or lowered, and/or the evaluation electronics comprises a program that compares with a corresponding programming the sensor signal with a nominal value, is connected to the motor-driven adjustment drive, and issues an adjusting command to the adjustment drive when the sensor signal deviates by a predetermined measure from the nominal value, wherein the adjusting command moves the adjustment drive in a direction by which the difference between the sensor signal and the nominal value is reduced. Here also, the afore described explanations to the embodiment of the control of the springy support of the frame part with an evaluation electronics and the targeted control of the motor-driven adjustment drive by the evaluation electronics apply correspondingly to the springy support of the trailing arms.

According to an embodiment of the invention, the weight of the lateral frames at least partially is held by a tension spring, respectively, that extends transversely to the working direction, is arranged behind the rear wall of the lateral frames, and is connected to the attachment frame, wherein the weight proportion held by the tension springs is changeable by means of a pretension of the tension springs adjustable by an adjustment device. In this embodiment of the invention, the lateral frames are at least partially held by the attachment frame so that the lateral frames do not press with their full weight on the cutter bar. By means of the tension spring, the proportion of the weight of the lateral frames that is held by the attachment frame is adjustable in a variable and selectable manner. Due to the at least partial relief of the lateral frames, the cutter bar can counteract an increasing ground pressure more easily by an evasive movement. The adaptation is realized quicker against reduced resistances. In case of an evasive movement, in the tension spring restoring forces are also built up by means of which the lateral frame is lowered again when the ground pressure against the cutter bar decreases. In this manner, the lateral frames can adapt quickly, easily and flexibly to unevenness of the ground encountered by the cutting mechanism during harvesting.

According to an embodiment of the invention, sensors are present at the lateral frames that determine an actual angle position of a correlated lateral frame relative to the attachment frame and/or to the frame part, the sensors are connected to the evaluation electronics and transmit the sensor values to the evaluation electronics, and the evaluation electronics comprises a program that determines with a corresponding programming an adjusting command to an adjustment drive for adjustment of the springy trailing arm as a function of the sensor value regarding the actual angle position of the correlated lateral frame. In this embodiment of the invention, an automated adjustment of the pivot position of the springy trailing arm by means of the sensor-supported control of the pivot position of the lateral frame is realized. When the lateral frame is relieved against the holding force of the tension spring in that the lateral frame moves relative to the central frame into a downwardly angled position, the adjustment drive of the springy trailing arm is adjusted in a direction that relieves the energy store partially and thus keeps the contact pressure of the cutter bar approximately the same. In addition to the sensor that monitors the pivot position of the lateral frame, a load sensor can be present also that determines the load of the tension spring and transmits it to the evaluation electronics. The sensor value in regard to the actual weight load acting on the tension spring can be incorporated into the determination of a value for actuation of the adjustment drive.

It is expressly noted that the afore described embodiments of the invention, taken alone but also in any combinations with each other, can be combined with the subject matter of the independent claim, provided no technically forced obstacles are in conflict therewith.

Further modifications and embodiments of the invention can be taken from the following subject matter description and the drawings.

BRIEF DESCRIPTION OF THE DRAWINGS

The invention will now be explained in more detail with the aid of embodiments. It is shown in:

FIG. 6: an enlarged illustration of the connecting region of the wheel at a lateral frame; and FIG. 7: an enlarged view of the attachment of the lateral frames.

DESCRIPTION OF PREFERRED EMBODIMENTS

Figure 1:
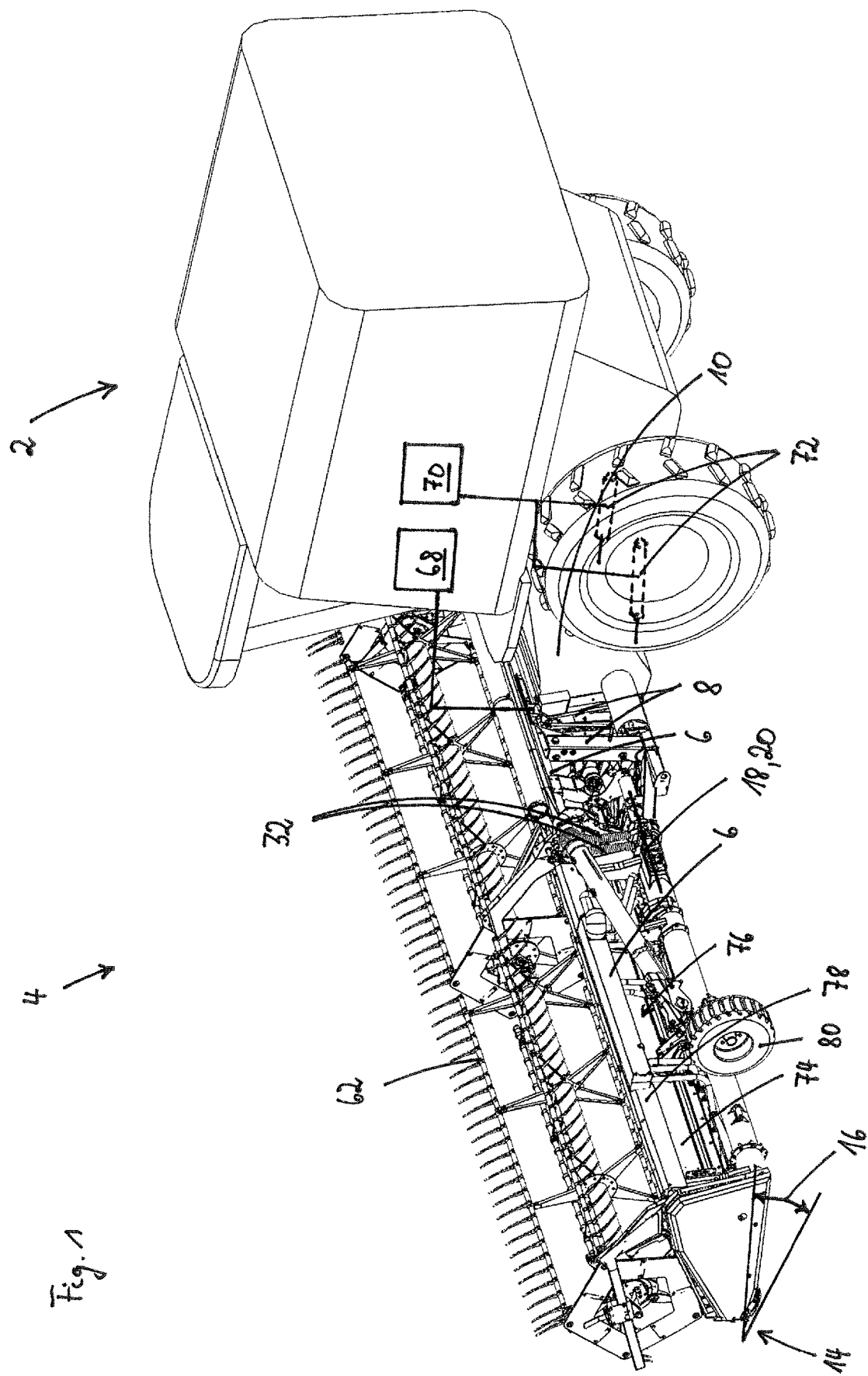
FIG. 1: a portion of a harvesting machine with a cutting mechanism in a view at a slant from behind.

In FIG. 1, a portion of a harvesting machine 2 with a cutting mechanism 4 in a view at a slant from the rear is illustrated. The cutting mechanism 4 comprises a frame part 6 that is connected by an attachment frame 8 to an intake channel 10 of the harvesting machine 2.

The cutter bar, with a plurality of adjacently arranged knife blades, as cutting element 14 fastened at the leading end of the cutting mechanism 4 is connected by a number of swinging arms 12 (see FIG. 3) to the frame part 6. In the embodiment, the swinging arms 12 are rigid and form a rigid component together with the frame part 6 (see FIG. 3). The cutting angle 16 at which the cutting element 14 is positioned in relation to the horizontal ground can be adjusted at the cutting mechanism 4 and adjusted to a desired value.

Figure 2:
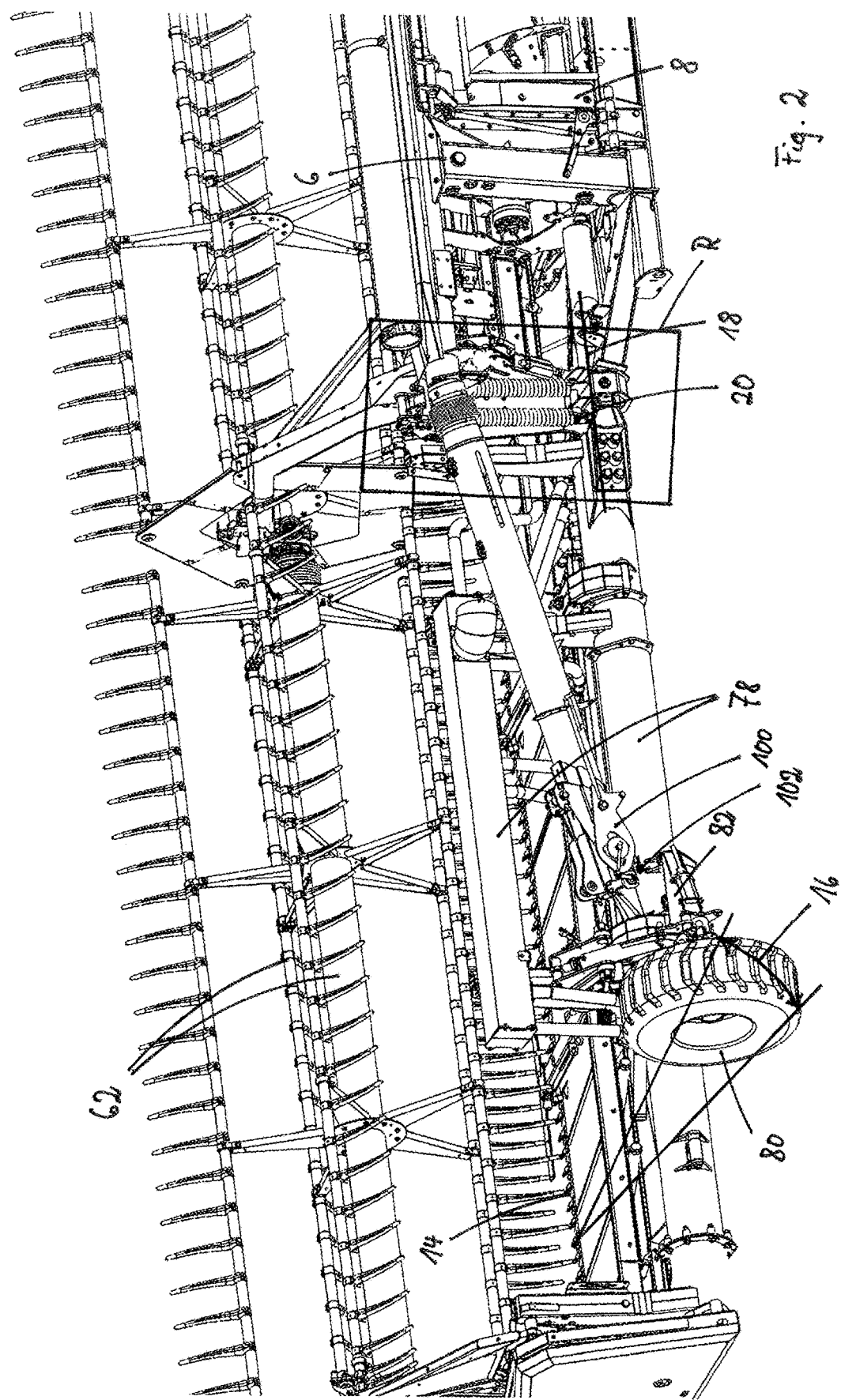
FIG. 2: an enlarged illustration of the cutting mechanism with a rectangle that marks the region that is illustrated enlarged in FIG. 3.

In FIG. 2, an enlarged illustration of the cutting mechanism 4 is illustrated. The device for adjustment of the cutting angle 16 of the cutting elements 14 is provided at the rear side 76 of the cutting mechanism 4 in the rectangle R whose contents is illustrated enlarged in FIG. 3. The rocker lever or rocker levers 24 are arranged at the upper end or above the rear wall 74 of the cutting mechanism 4. The length-changeable energy store or energy stores 32 are arranged at the rear side 76 of the rear wall 74 in a precisely vertical, or at least primarily vertical, orientation.

Figure 3:
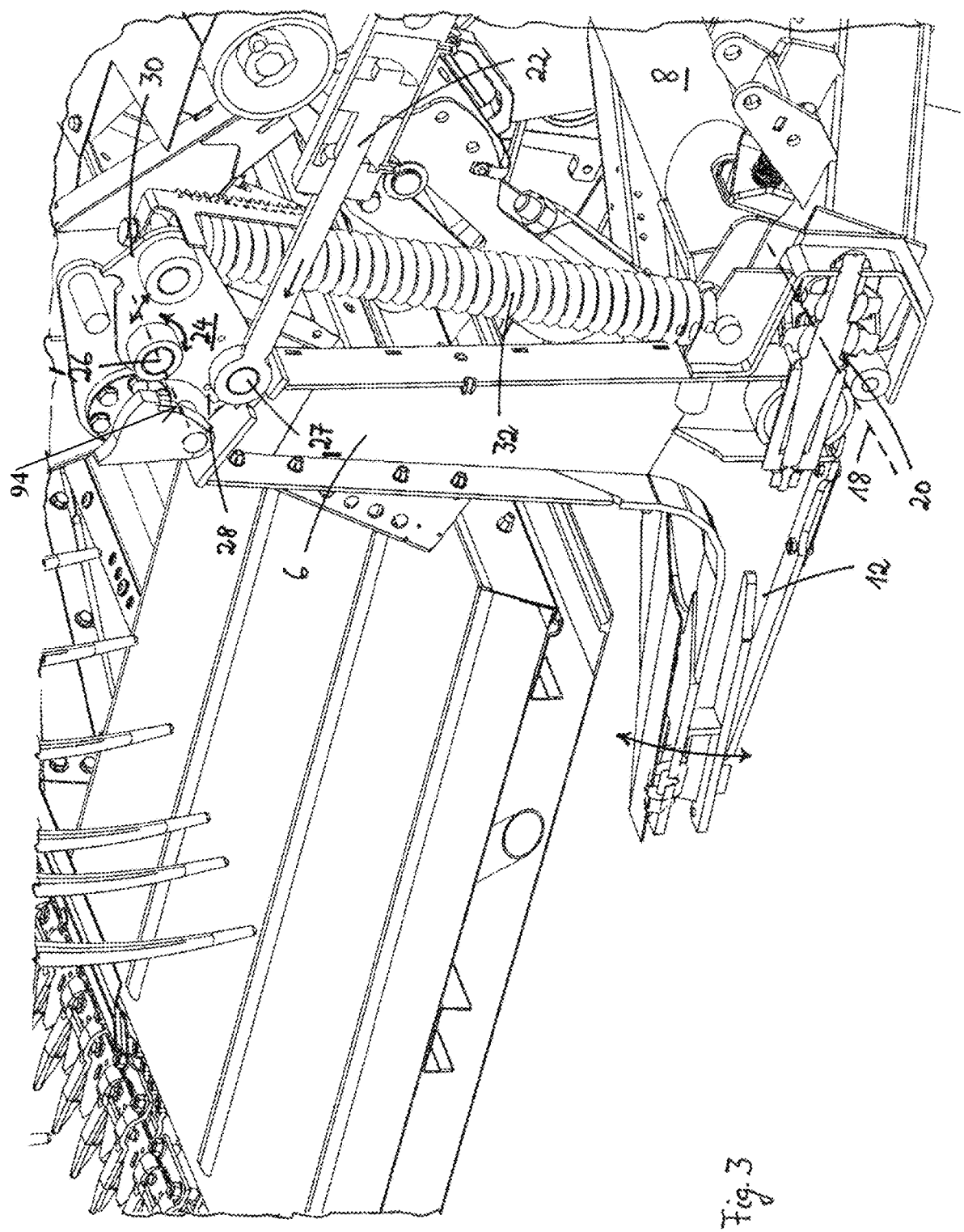
FIG. 3: details of the device for cutting angle adjustment.

In FIG. 3, the details of the device for cutting angle adjustment can be seen more clearly. The frame part 6 is rotatably supported about axis 18 at the rotary bearing 20 fastened to the attachment frame 8. For adjustment of the cutting angle 16, a hydraulic cylinder is provided as an adjustment drive 22. For an extension movement in the direction of the arrow illustrated in the piston rod, the adjustment drive 22 pushes the upper end of the frame part 6 away from the attachment frame 8 wherein the frame part 6 rotates about the axis 18 in doing so. In this way, the cutting angle 16 at which the cutting element 14 is held in relation to the ground is steeper. Upon opposite movement, the angle of attack 16 becomes less steep. In this manner, a desired cutting angle of the cutting element 14 can be adjusted.

However, the adjustment drive 22 does not engage directly at the frame part 6 but is rotatably connected with the first side 28 of a rocker lever 24 rotatable about an axis 26 and is connected by the axis 26 to the frame part 6. The axis 26 extends preferably transversely to the working direction of the cutting mechanism 4, as indicated by the dashed line, wherein this orientation is to be maintained at least approximately, minimal deviations however mean no significant functional impairment in this context. When the adjustment drive 22 is in an unchanged position, the point of attack 27 of the adjustment drive 22 at the rocker lever 24 provides a fixation point about which the rocker lever 24 with the axis 26 rotates in the direction of the correspondingly indicated double arrow when the frame part 6 is moved about the axis 18 upwardly or downwardly due to a changing ground pressure, as is indicated in the region of the swinging arm 12 by the double arrow.

At the second side 30 of the rocker lever 24, a length-changeable energy store 32 engages in a rotatable manner. The other end of the length-changeable energy store 32 is connected to the attachment frame 8. In the illustrated embodiment, the length-changeable energy store 32 is a spiral spring. The length-changeable energy store 32 can also be formed of a plurality of spiral springs, as illustrated in FIG. 2. When the swinging arms 12 with their leading end at which the cutting element 14 is attached are pushed upwardly, for example, by ground contact, they push the axis 26 to which the rocker arm 24 is attached along a circular movement about the axis 18 to the rear by the rotary movement of the frame part 6 connected to the swinging arms 12. The lifting force can act directly on one or a plurality of swinging arms 12 but it can also act indirectly on the cutting element 14 or skid plates connected to the swinging arms 12 that can be attached below the swinging arms 12 to the bottom side of the cutting mechanism 4 and transmit the lifting force to one or a plurality of swinging arms 12. Upon rotary movement of the rocker lever 24 about the axis 26, the length-changeable force store 32 is compressed. When the force with which the swinging arms 12 have been pushed upwardly is canceled, the restoring forces that are existing in the length-changeable energy store 32 move the rocker lever 24 again into the neutral position. Upon this restoring movement, the frame part 6 together with the swinging arms 12 also moves back into the initial position due to the rocker lever 24.

In the described manner, the frame part 6 upon ground contact can adapt in upward and downward direction to changes in the ground contour in a very flexible manner against and with the force of the length-changeable energy store 32.

Figure 4:
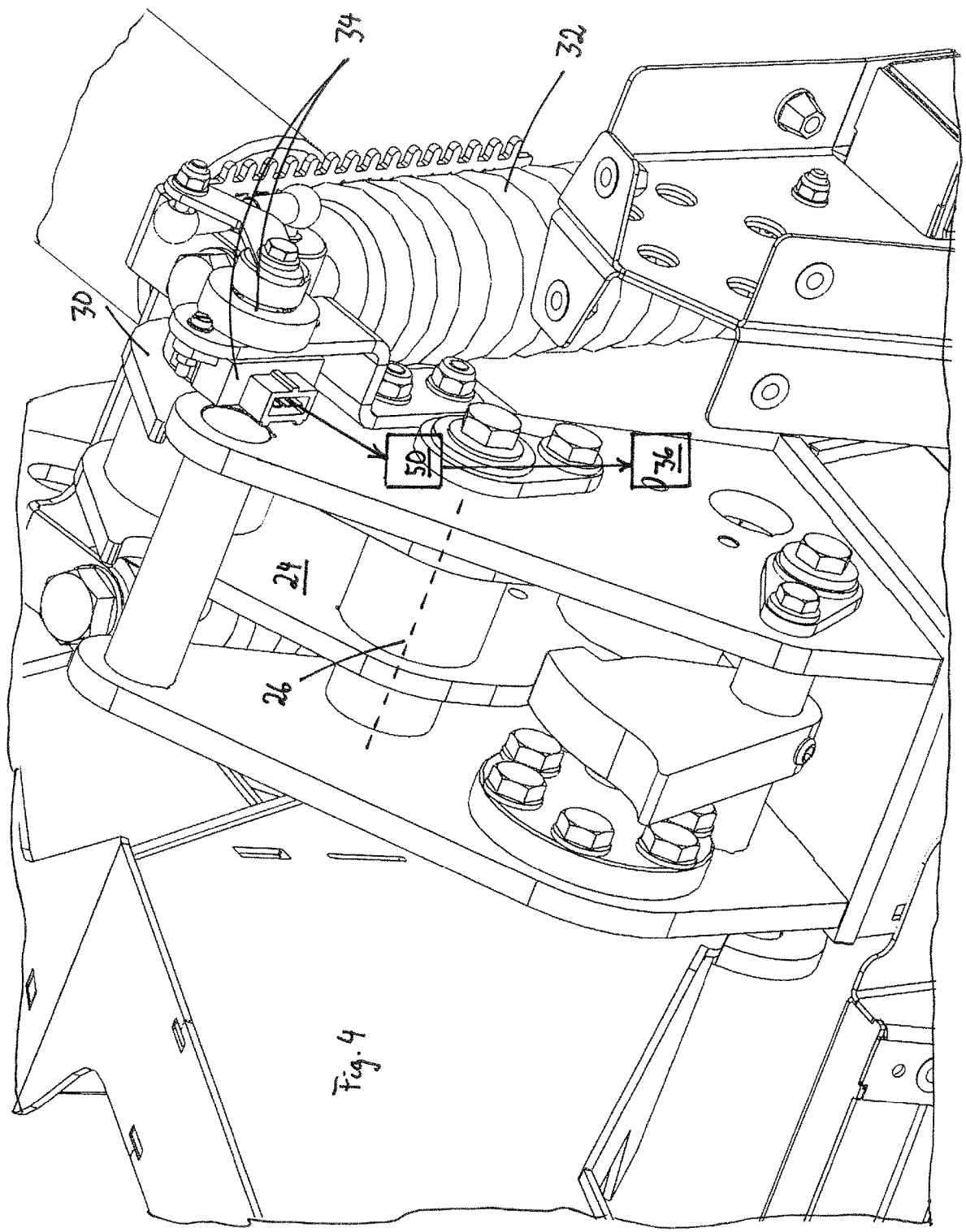
FIG. 4: a lever linkage with sensor.

In FIG. 4, a sensor 34 is illustrated that detects by a lever linkage the deflection movements of the length-changeable energy store 32. Instead of detecting the deflection movements of the length-changeable energy store 32, the sensor 34 can also be designed to detect the tilting movements of the rocker lever 24. The sensor 34 transmits the measured movement data by means of a connection line 42 as sensor signal 50 to an evaluation electronics 36, as illustrated also in FIG. 5. The latter comprises a program 38 that generates with a corresponding programming a warning signal 40 at a decision point 39 when the sensor signal is in the range of an upper or lower limit value.

Figure 5:
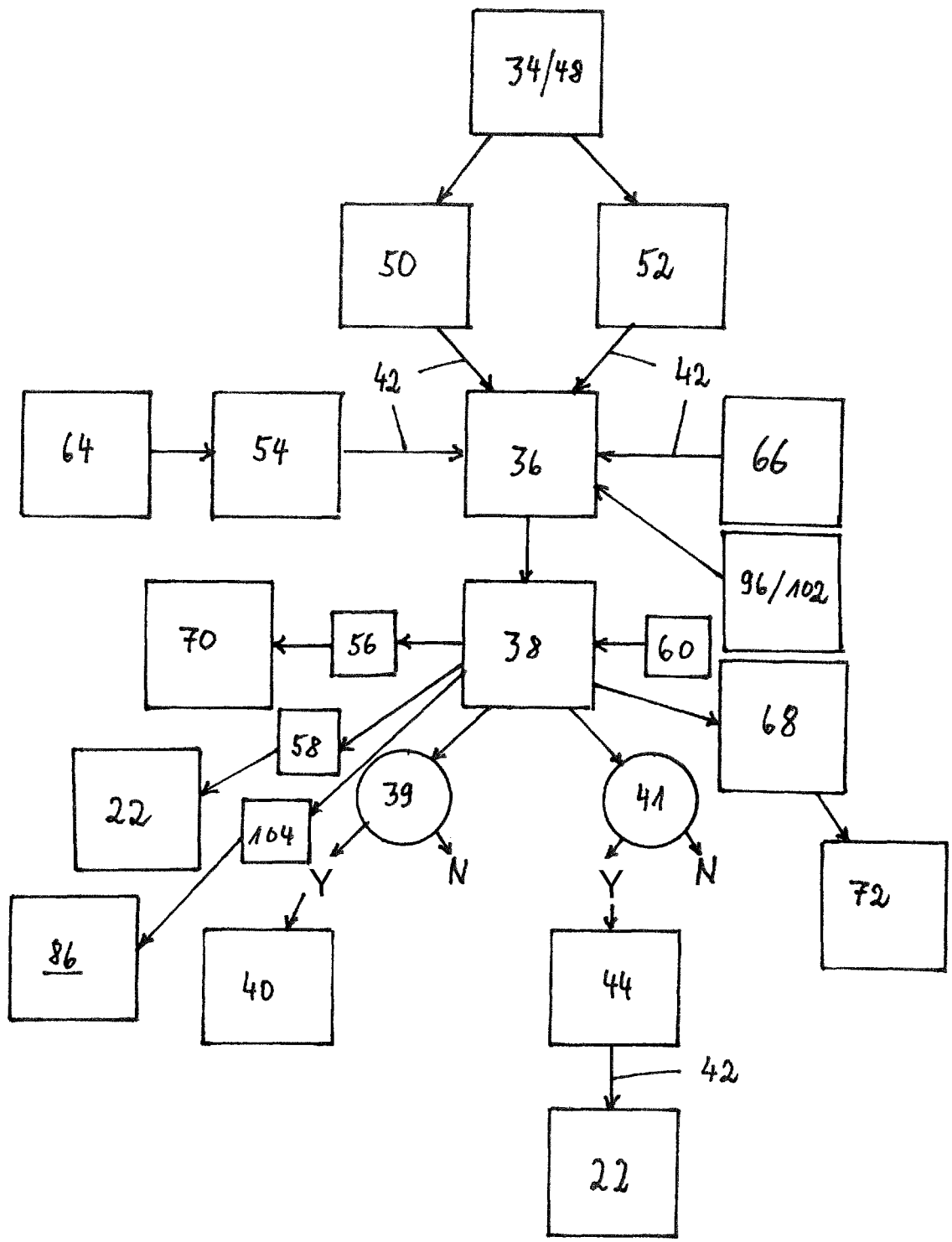
FIG. 5: a data flow of sensor values.

In FIG. 5, the data flow of sensor values is illustrated. The program 38 of the evaluation electronics 36 compares at a decision point 41 with a corresponding programming the sensor signal 50 with a nominal value 60. The evaluation electronics is connected to the motor-driven adjustment drive 22 and issues an adjusting command 44 to the adjustment drive 22 when the sensor signal 50 deviates by a predetermined measure from the nominal value 60. The adjusting command 44 moves the adjustment drive 22 in a direction with which, by a tilting movement of the rocker lever 24, the pretension of the length-changeable energy store 32 is increased or lowered. The evaluation electronics 36 can also comprise a program 38 that compares with a corresponding programming the sensor signal 50 to a nominal value 60, is connected to the motor-driven adjustment drive 22, and issues an adjusting command 44 to the adjustment drive 22 when the sensor signal 50 deviates by a predetermined measure from the nominal value 60, wherein the adjusting command 44 moves the adjustment drive 22 in a direction by which the difference between the sensor signal 50 and the nominal value 60 is reduced.

In a deviating embodiment, the program 38 does not receive a sensor signal 50 regarding a movement of a component but a force sensor signal 52 from a force sensor 48 about a change of an acting force, for example, the pressure in a hydraulic system. The program 38 of the evaluation electronics 36 compares then with a corresponding programming the force sensor signal 52 with a nominal value 60, the evaluation electronics 36 is connected to the motor-driven adjustment drive 22 and issues an adjusting command 44 to the adjustment drive 22 when the force sensor signal 52 deviates by a predetermined measure from the nominal value 60. The adjusting command 44 moves the adjustment drive 22 in a direction with which, by a tilting movement of the rocker lever 24, the pretension of the length-changeable energy store 32 is increased or lowered. The evaluation electronics 36 can also comprise a program 38 that compares with a corresponding programming the force sensor signal 52 with a nominal value 60, is connected to the motor-driven adjustment drive 22 and issues an adjusting command 44 to the adjustment drive 22 when the force sensor signal 52 deviates by a predetermined measure from the nominal value 60, wherein the adjusting command 44 moves the adjustment drive 22 in a direction by which the difference between the force sensor signal 52 and the nominal value 60 is reduced.

In FIG. 1, it is shown that the cutting mechanism 4 comprises an adjustable driven conveying aid 62 in the form of a reel whose actual position is monitored by a position sensor 64. The position sensor 64 is connected to the evaluation electronics 36 and transmits the position sensor value 54 to the evaluation electronics 36. The evaluation electronics 36 comprises a program 38 that determines with a corresponding programming the adjusting command 44 as a function of the position sensor value 54 regarding the actual position of the conveying aid 62. Again, the adjusting command 44 is transmitted to the adjustment drive 22.

According to an embodiment, the evaluation electronics 36 is connected to a speed sensor 66 and the evaluation electronics 36 comprises a program 38 that determines with a corresponding programming the adjusting command 44 as a function of the speed sensor signal transmitted by the speed sensor 66.

According to an embodiment, the evaluation electronics 36 comprises a program 38 that determines with a corresponding programming during the evaluation of the sensor signal 50 or of the force sensor signal 52 an exceedance of a limit value across a time interval and generates an adjusting signal 56 to a height control 70 of the intake channel 10 of the harvesting machine 2 in response to which the height control 70 lifts or lowers the intake channel 10.

The afore described adjustment drives 22 can, of course, be present at oppositely positioned sides of the intake channel 10 and enable with corresponding rocker levers 24 and length-changeable energy stores 32 a pivoting action of the frame part 6 about the axis 18. In this way, it is also possible that the frame part 6 on its right and left sides can dip to different degrees or even dip on one side while rebound on the other side and return again after a dip movement into the initial position when the force component causing the dip movement is canceled again. The evaluation electronics 36 can also move the adjustment drives 22 independent from each other with the program 38 with respective independent adjusting commands 44 if this appears to be expedient based on the sensor data of the oppositely positioned sides of the intake channel 10. Also, the evaluation electronics 36 can generate an adjusting signal 56 and transmit this to a pivot control 68 connected to the evaluation electronics 36 for pivoting the cutting mechanism 4 about the longitudinal axis of the harvesting machine 2 that is pointing in the working direction. The pivot control 68 rotates the cutting mechanism 4 then by actuation of a pivot drive 72 in a direction about the longitudinal axis.

In an embodiment not illustrated in more detail, the attachment frame 8 and/or the frame part 6 are pivotably connected at oppositely positioned sides to lateral frames 78 that are shown in FIG. 2 at whose longitudinal side facing in working direction cutting elements 14 are also arranged. The lateral frames 78 are supported respectively by a wheel 80 on the ground and the respective wheel 80 is fastened to a trailing arm 82 that is connected to the lateral frame 78 so as to be pivotable about an axis 84. FIG. 6 shows in an enlarged view the suspension of a wheel 80 in more detail. A respective trailing arm 82 is adjustable by means of a motor-driven adjustment drive 86 in its height position. The adjustment drive 86 is connected rotatably to a first side 90 of a rocker lever 88 that is rotatable about an axis 26; a length-changeable energy store 32 engages rotatably at its second side 92. The trailing arm 82 is movable against the force of the length-changeable energy store 32 by a tilting movement of the rocker lever 88. The afore described explanations apply likewise to the possibility of the wheels 80 to dip against the force of the length-changeable energy store and, after cancellation of a force component, rebound again into the initial position. A sensor 96 is correlated with the trailing arm 82 which detects, for example, as a rotary potentiometer, the actual pivot position of the trailing arm 82. The sensor 96, as illustrated in FIG. 5, is connected to an evaluation electronics 36 to which it transmits a sensor signal, corresponding to the actual pivot position or the acting force, and the evaluation electronics 36 comprises a program 38 that generates with a corresponding programming a warning signal 40 when the sensor signal is in the range of an upper or lower limit value.

As can be seen in the enlarged illustration in FIG. 7, the weight of the lateral frames 78 is at least partially held by a tension spring 98, respectively, extending transversely to the working direction, arranged behind the rear wall 74 of the lateral frames 78, not illustrated in detail in FIG. 7, and connected to the attachment frame 8. The weight proportion of the weight of the lateral frames 78 and the machine components connected thereto that is held by the tension springs 98 can be changed by a pretension of the tension springs 98 adjustable by an adjustment device 100. Sensors 102 are present at the lateral frames 78 which determine an actual angle position of a correlated lateral frame 78 to the attachment frame 8 and/or to the frame part 6. The sensors 102 are connected to the evaluation electronics 36 and transmit the sensor values 50 to the evaluation unit 36, as illustrated in FIG. 5. The evaluation electronics 36 comprises a program 38 that determines with a corresponding programming the adjusting command 104 to an adjustment drive 86 for adjusting the actual angle position of the correlated wheel support 82 with energy store 32 as a function of the sensor value 50. By means of the adjustment drive 86 controlled by the adjusting command 104, the pretension of the corresponding energy store 32 can be changed.

The invention is not limited to the afore described embodiments. A person of skill in the art will have no difficulties to modify the embodiments in a manner appearing suitable to him in order to adapt them to concrete application situations.

LIST OF REFERENCE CHARACTERS 2 harvesting machine
4 cutting mechanism
6 frame part
8 attachment frame
10 intake channel
12 swinging arm
14 cutting element
16 cutting angle
18 axis
20 rotary bearing
22 adjustment drive
24 rocker lever
26 axis (rocker lever)
27 point of attack
28 first side
30 second side
32 energy store
34 sensor (energy stores/rocker lever) (claim 3, 4)
36 evaluation electronics
38 program
39 decision point
40 warning signal
41 decision point
42 connection line
44 adjusting command
48 energy sensor
50 sensor signal
52 force sensor signal
54 position sensor value
56 adjusting signal
58 adjusting command
60 nominal value
62 conveying aid (reel)
64 position sensor
66 speed sensor 68 pivot control
70 height control intake channel
72 pivot drive
74 rear wall
76 rear side of rear wall
78 lateral frame
80 wheel
82 trailing arm
84 axis (trailing arm)
86 adjustment drive (trailing arm)
88 rocker lever
90 first side
92 second side
94 axis (rocker lever)
96 sensor (trailing arm)
98 tension spring
100 adjustment device (tension spring)
102 sensor (angle position)
104 adjusting command

What is claimed is:

1. A cutting mechanism for attachment to a harvesting machine, the cutting mechanism comprising:
an attachment frame comprising connecting means for attachment to an intake channel of the harvesting machine;
a frame part comprising swinging arms, wherein the swinging arms point in a working direction of the cutting mechanism and comprise leading ends in the working direction of the cutting mechanism;
cutting elements connected to the leading ends of the swinging arms and configured to cut crop;
wherein the frame part is rotatably supported in a rotary bearing of the attachment frame;
a motor-driven adjustment drive connected to the frame part and configured to adjust, when actuated, a cutting angle of the cutting elements such that an angle of attack of the cutting elements in relation to the ground changes;
a rocker lever connected to the frame part so as to rotate about a transverse axis extending transversely to the working direction of the cutting mechanism, the rocker lever comprising a first side and a second side, wherein the motor-driven adjustment drive is connected rotatably to the first side of the rocker lever;
a length-changeable energy store engaging rotatably at the second side of the rocker lever;
wherein the frame part with the swinging arms is movable against a force of the length-changeable energy store by a tilting movement of the rocker lever about the transverse axis when a lifting force is acting at least on one of the swinging arms.

2. The cutting mechanism according to claim 1, wherein the length-changeable energy store is comprised of one or a plurality of springs.

3. The cutting mechanism according to claim 1, further comprising:
an evaluation electronics;
a sensor configured to detect an actual length of the length-changeable energy store or a pivot position of the rocker lever, wherein the sensor is connected to the evaluation electronics and transmits a sensor signal, corresponding to the actual length or the pivot position, to the evaluation electronics;
wherein the evaluation electronics comprises a program that generates with a corresponding programming a warning signal when the sensor signal is in a range of an upper limit value or a lower limit value of the actual length or of the pivot position.

4. The cutting mechanism according to claim 1, further comprising:
an evaluation electronics;
a sensor configured to detect an actual length of the length-changeable energy store or a pivot position of the rocker lever, wherein the sensor is connected to the evaluation electronics and transmits a sensor signal, corresponding to the actual length or the pivot position, to the evaluation electronics;
wherein the evaluation electronics is connected to the motor-driven adjustment drive and comprises a program that compares with a corresponding programming the sensor signal with a nominal value;
wherein the evaluation electronics issues an adjusting command to the motor-driven adjustment drive when the sensor signal deviates by a predetermined measure from the nominal value;
wherein the adjusting command moves the motor-driven adjustment drive in a direction with which, by a tilting movement of the rocker lever, a pretension of the length-changeable energy store is increased or lowered, and/or wherein the adjusting command moves the motor-driven adjustment drive in a direction by which a difference between the sensor signal and the nominal value is reduced.

5. The cutting mechanism according to claim 4, further comprising:
an evaluation electronics;
a speed sensor configured to detect a travel speed of the harvesting machine, wherein the speed sensor is connected to the evaluation electronics and transmits a speed sensor signal to the evaluation electronics;
wherein the evaluation electronics comprises a program that determines with a corresponding programming the adjusting command as a function of the speed sensor signal.

6. The cutting mechanism according to claim 4, wherein the evaluation electronics comprises a program that determines with a corresponding programming during an evaluation of the sensor signal an exceedance of a limit value of the sensor signal across a time interval and generates an adjusting signal to be issued to a height control of the intake channel of the harvesting machine and, in response to the adjusting signal, the height control lifts or lowers the intake channel.

7. The cutting mechanism according to claim 1, further comprising:
an evaluation electronics;
a force sensor configured to detect a force acting on the frame part and/or the length-adjustable energy store, wherein the force sensor is connected to the evaluation electronics and transmits a force sensor signal, corresponding to the force acting on the frame part and/or the length-adjustable energy store, to the evaluation electronics;
wherein the evaluation electronics is connected to the motor-driven adjustment drive and comprises a program that compares with a corresponding programming the force sensor signal with a nominal value;
wherein the evaluation electronics issues an adjusting command to the motor-driven adjustment drive when the force sensor signal deviates by a predetermined measure from the nominal value;
wherein the adjusting command moves the motor-driven adjustment drive in a direction with which, by a tilting movement of the rocker lever, a pretension of the length-changeable energy store is increased or lowered, and/or the adjusting command moves the motor-driven adjustment drive in a direction by which a difference between the force sensor signal and the nominal value is reduced.

8. The cutting mechanism according to claim 7, further comprising:
an evaluation electronics;
a speed sensor configured to detect a travel speed of the harvesting machine, wherein the speed sensor is connected to the evaluation electronics and transmits a speed sensor signal to the evaluation electronics;
wherein the evaluation electronics comprises a program that determines with a corresponding programming the adjusting command as a function of the speed sensor signal.

9. The cutting mechanism according to claim 7, wherein the evaluation electronics comprises a program that determines with a corresponding programming during an evaluation of the force sensor signal an exceedance of a limit value of the force sensor signal across a time interval and generates an adjusting signal to be issued to a height control of the intake channel of the harvesting machine and, in response to the adjusting signal, the height control lifts or lowers the intake channel.

10. The cutting mechanism according to claim 1, further comprising:
an adjustable driven conveying aid:
an evaluation electronics;
a position sensor configured to monitor an actual position of the adjustable driven conveying aid, wherein the position sensor is connected to the evaluation electronics and transmits a position sensor signal corresponding to the actual position of the adjustable driven conveying aid to the evaluation electronics;
wherein the evaluation electronics comprises a program that determines with a corresponding programming, as a function of the position sensor signal corresponding to the actual position of the adjustable driven conveying aid, an adjusting command to be issued to the motor-driven adjustment drive for adjustment of the cutting angle and/or to be issued to a height control of the intake channel.

11. The cutting mechanism according to claim 10, further comprising:
an evaluation electronics;
a speed sensor configured to detect a travel speed of the harvesting machine, wherein the speed sensor is connected to the evaluation electronics and transmits a speed sensor signal to the evaluation electronics;
wherein the evaluation electronics comprises a program that determines with a corresponding programming the adjusting command as a function of the speed sensor signal.

12. The cutting mechanism according to claim 1, wherein two of said motor-driven adjustment drive, two of said rocker arm, and two of said length-changeable energy store are provided and arranged on opposite sides of the intake channel, respectively, wherein the frame part with the swinging arms is movable against the force of one or both of said two length-changeable energy stores by the tilting movement of one or both of said two rocker levers, respectively, when the lifting force is acting on at least one of the swinging arms.

13. The cutting mechanism according to claim 12, further comprising an evaluation electronics and one or more sensors selected from the group consisting of:
a sensor configured to detect an actual length of one or both of said two length-changeable energy stores or a pivot position of one or both of said two rocker levers, wherein the sensor is connected to the evaluation electronics and transmits a first sensor signal corresponding to the actual length or the pivot position to the evaluation electronics;
a force sensor configured to detect a force acting on the frame part and/or one or both of said two length-adjustable energy stores, wherein the force sensor is connected to the evaluation electronics and transmits a second sensor signal corresponding to the force acting on the frame part and/or one or both of said two length-adjustable energy stores to the evaluation electronics;
a position sensor configured to monitor an actual position of an adjustable driven conveying aid, wherein the position sensor is connected to the evaluation electronics and transmits a third sensor signal corresponding to the actual position of the adjustable driven conveying aid to the evaluation electronics; and
a speed sensor configured to detect a travel speed of the harvesting machine, wherein the speed sensor is connected to the evaluation electronics and transmits a fourth sensor signal corresponding to the travel speed to the evaluation electronics;
wherein the evaluation electronics comprises a program with which with a corresponding programming said two adjustment drives are movable independent from each other by adjusting commands determined by the evaluation electronics based one or more of the first sensor signal, the second sensor signal, the third sensor signal, and the fourth sensor signal.

14. The cutting mechanism according to claim 13, further comprising a pivot control connected to the evaluation electronics and configured to pivot the cutting mechanism about a longitudinal axis of the harvesting machine pointing in the working direction of the harvesting machine, wherein the evaluation electronics comprises a program that determines with a corresponding programming an exceedance of a limit value across a time interval at one or both opposite sides of the intake channel during the evaluation of the first sensor signal or of the second sensor signal, and, when the exceedance of the limit value across a time interval on one side of the intake channel or a difference between the values of the first sensor signals or of the second sensor signals on the opposite sides of the intake channel exceeding a threshold value across a time interval is determined, generates an adjusting signal and transmits the adjusting signal to the pivot control, wherein the pivot control in response to the adjusting signal actuates a pivot drive to rotate the cutting mechanism in a direction about the longitudinal axis.

15. The cutting mechanism according to claim 1, wherein the rocker lever is arranged at an upper end or above a rear wall of the cutting mechanism and the length-changeable energy store is arranged at a rear side of the rear wall in a precisely vertical, or at least predominantly vertical, orientation.

16. The cutting mechanism according to claim 1, wherein the swinging arms are rigid and form a rigid component together with the frame part.

17. The cutting mechanism according to claim 1, further comprising lateral frames pivotably connected to opposite sides of the attachment frame and/or the frame part, wherein the lateral frames each comprise a longitudinal side facing in the working direction, wherein the lateral frames comprise lateral cutting elements arranged at the longitudinal sides, wherein the lateral frames each are supported by a wheel on the ground, wherein each wheel is connected to a trailing arm that is connected to the respective lateral frame so as to be pivotable, wherein each trailing arm is height-adjustable by a motor-driven height adjustment drive, wherein the motor-driven height adjustment drive is connected rotatably to a first side of a lateral rocker lever that is rotatable about an axis, wherein a lateral length-changeable energy store engages rotatably at a second side of the lateral rocker lever, and wherein the trailing arm is movable against a force of the lateral length-changeable energy store by a tilting movement of the lateral rocker lever.

18. The cutting mechanism according to claim 17, wherein the lateral length-changeable energy store is comprised of one or a plurality of springs.

19. The cutting mechanism according to claim 17, further comprising a sensor correlated with the trailing arm and configured to detect an actual pivot position of the trailing arm and/or a force acting on the trailing arm, wherein the sensor is connected to an evaluation electronics and transmits a sensor signal, corresponding to the actual pivot position or the force acting on the trailing arm, to the evaluation electronics, wherein the evaluation electronics comprises a program that generates with a corresponding programming a warning signal when the sensor signal is in a range of an upper limit value or lower limit value of the sensor signal.

20. The cutting mechanism according to claim 17, further comprising:
- an evaluation electronics;
- a sensor arranged at the trailing arm and configured to detect an actual pivot position of the trailing arm and/or a force acting on the trailing arm, wherein the sensor is connected to the evaluation electronics and transmits a sensor signal, corresponding to the actual pivot position or the force acting on the trailing arm, to the evaluation electronics;
- wherein the evaluation electronics is connected to the motor-driven height adjustment drive and comprises a program that compares with a corresponding programming the sensor signal with a nominal value;
- wherein the evaluation electronics issues an adjusting command to the motor-driven height adjustment drive when the sensor signal deviates by a predetermined measure from the nominal value;
- wherein the adjusting command moves the motor-driven height adjustment drive in a direction with which, by a tilting movement of the lateral rocker lever, a pretension of the lateral length-changeable energy store is increased or lowered, and/or the adjusting command moves the motor-driven height adjustment drive in a direction by which a difference between the sensor signal and the nominal value is reduced.

21. The cutting mechanism according to claim 17, further comprising tensions springs connected to the attachment frame and holding at least partially a weight of the lateral frames, wherein the tension springs extend transversely to the working direction and are arranged behind a rear wall of the lateral frames, wherein a weight proportion of the lateral frames held by the tension springs is adjustable by a pretension of the tension springs, wherein the pretension is adjustable by an adjustment device.

22. The cutting mechanism according to claim 17, further comprising sensors arranged at the lateral frames and configured to determine an actual angle position of the respective lateral frame in relation to the attachment frame and/or to the frame part, wherein the sensors are connected to an evaluation electronics and transmit sensor values of the actual angle position to the evaluation electronics, and wherein the evaluation electronics comprises a program that determines with a corresponding programming an adjusting command to be issued to the motor-driven height adjustment drive for adjustment of a pretension of the lateral length-changeable energy store as a function of the sensor value regarding the actual angle position.

\* \* \* \* \*